(12) United States Patent
Zegheru

(10) Patent No.: US 8,197,127 B2
(45) Date of Patent: Jun. 12, 2012

(54) ULTRA LOW CURRENT CONSUMPTION COMPARATOR FOR THERMAL SHUTDOWN

(75) Inventor: Cristi Stefan Zegheru, Bucharest (RO)

(73) Assignee: Infineon Technologies Austria AG, Villach (AT)

( * ) Notice: Subject to any disclaimer, the term of this patent is extended or adjusted under 35 U.S.C. 154(b) by 925 days.

(21) Appl. No.: 12/205,992

(22) Filed: Sep. 8, 2008

(65) Prior Publication Data
US 2010/0060341 A1 Mar. 11, 2010

(51) Int. Cl.
G01K 1/00 (2006.01)
(52) U.S. Cl. ........................................ 374/100; 374/178
(58) Field of Classification Search .................. 374/100, 374/170, 178; 702/130
See application file for complete search history.

(56) References Cited

U.S. PATENT DOCUMENTS

| | | | | |
|---|---|---|---|---|
| 6,759,891 B2 * | 7/2004 | Dotson | ........................ | 327/512 |
| 7,003,424 B2 * | 2/2006 | Ravatin et al. | ................ | 702/132 |
| 7,127,368 B2 * | 10/2006 | Choi | ............................ | 702/130 |
| 7,427,158 B2 * | 9/2008 | Yoshida | ........................ | 374/172 |
| 7,535,128 B2 * | 5/2009 | Wang et al. | .................... | 307/115 |
| 7,581,882 B2 * | 9/2009 | Noguchi | ........................ | 374/178 |
| 7,775,710 B2 * | 8/2010 | Mukherjee | ....................... | 374/170 |
| 2006/0229839 A1 * | 10/2006 | Butler | ............................ | 702/130 |
| 2008/0165826 A1 * | 7/2008 | Cheng et al. | ................... | 374/178 |
| 2010/0329304 A1 * | 12/2010 | Doorenbos | .................... | 374/178 |

* cited by examiner

*Primary Examiner* — Lisa Caputo
*Assistant Examiner* — Tania Courson
(74) *Attorney, Agent, or Firm* — Slater & Matsil, L.L.P.

(57) ABSTRACT

An embodiment of the invention relates to a temperature-sensing device and a related method. In an embodiment, the device senses a temperature with a first sensing circuit configured to assert a signal when temperature is above a first temperature threshold level, and a second sensing circuit configured to substantially disable a bias current that powers the first sensing circuit when a sensed level of temperature is below a second, lower temperature threshold level. Accordingly, the device is able to draw substantially reduced current from a power source when the sensed temperature level is less than the second threshold level. Other physical parameters such as strain or pressure may also be sensed using the same technique.

20 Claims, 2 Drawing Sheets

ULTRA LOW CURRENT CONSUMPTION COMPARATOR FOR THERMAL SHUTDOWN

TECHNICAL FIELD

An embodiment of the invention relates generally to physical parameter sensing and methods, and more particularly to the use of a semiconductor device to accurately sense a physical parameter such as temperature with low current drain.

BACKGROUND

Integrated circuits generally require a temperature-sensing circuit element to sense a local temperature so that protection for the circuit can be provided against an overtemperature condition, especially in automotive power applications where high temperatures under the hood of a car can be experienced. A thermal shutdown circuit prevents the integrated circuit from destruction under a fault condition, for example, when the output of the integrated circuit is continuously short-circuited. The temperature-sensing device is generally specified to be quite precise, since the difference between an acceptable operating temperature, for example, a device temperature of 150° C., and a maximum allowed silicon temperature, for example, 200° C., is often not that large in view of the difficulty of accurately reproducing temperature-sensing devices in silicon and other semiconductor materials.

A conventional way to sense temperature with a silicon device is to sense a bipolar transistor base-emitter junction voltage when the transistor is supplied with an accurately controlled collector current. An accurately controlled current can be produced by a current mirror using techniques well known in the art. The controlled current flows through the base-emitter junction that is sensed. The base-emitter junction voltage can be detected by a comparator with an input terminal coupled to another reference voltage. Sensing the junction voltage when it carries a known current provides the underlying mechanism to implement thermal protection. The base-emitter junction voltage with changing temperature has a slope that is approximately −2 mV/K, with excellent linearity for a fixed collector current over the whole range of temperatures experienced in an automotive environment.

However, to provide a sufficiently accurate indication of temperature for automotive and other temperature-sensitive applications that is independent of integrated circuit manufacturing process variations requires a substantial collector current in the temperature-sensing bipolar transistor. The high collector current increases the total current consumption of the integrated circuit to be protected. To diminish the impact of the large collector current on the integrated circuit quiescent current, the biasing current for the temperature-sensing transistor collector has been decreased in recent device designs. The result of the reduced collector current is imprecision of the sensed temperature, or the need for more controls and associated costs for a manufacturing process for the device. The quiescent current of an integrated circuit is generally a device-specified parameter that is generally required to be a low value, particularly in automotive and other battery-powered applications.

Other examples are encountered in which there is a need to accurately sense a varying level of a physical parameter, such as a strain, a pressure, or an electrical flux, with an electronic device. Particularly in those instances where the sensing instrument is portable or remotely powered, the need to accurately signal a high or low level of the physical parameter with minimal electrical drain is an important design consideration.

Thus, there is a design trade-off between the accuracy of sensing a physical parameter such as temperature and device dissipation in conventional semiconductor parameter-sensing arrangements. There is a need for a process and related method to provide an accurate indication of a physical parameter such as a local temperature for device protection without incurring a substantial power dissipation penalty that avoids the disadvantages of conventional approaches.

SUMMARY OF THE INVENTION

In accordance with an exemplary embodiment, a device for sensing a physical parameter and a related method are provided. In an embodiment, the device senses the physical parameter with a first sensing circuit configured to assert a signal when a sensed level of the physical parameter crosses a first threshold level. The device further includes a second sensing circuit configured to substantially disable a bias current which is preferably a controlled bias current that powers the first sensing circuit when the sensed level of the physical parameter crosses a second threshold level. In an embodiment, the first threshold level is higher than the second threshold level. In an embodiment, the device asserts the signal when the sensed level of the physical parameter exceeds the first threshold level. In an embodiment, the second sensing circuit is configured to substantially disable the bias current when the sensed level of the physical parameter is less than the second threshold level. Accordingly, in an embodiment, the device is able to draw a reduced current from a power source when the sensed level of the physical parameter by the second sensing circuit is less than the second threshold level. In an embodiment, the physical parameter is temperature, but another physical parameter such as a strain or a pressure, without limitation, may also be sensed. In an embodiment, the first sensing circuit is formed with a first bipolar transistor with a base coupled to a collector thereof, the collector of the first bipolar transistor coupled to a controlled current source. In an embodiment, second sensing circuit is formed with a second bipolar transistor with a base coupled to a reference voltage source so that the bias current can be substantially disabled when the level of the physical parameter is below the second threshold level. In a further embodiment, the second sensing circuit is formed with a current mirror coupled to the second bipolar transistor to substantially disable the bias current.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a temperature-sensing circuit employing a bipolar transistor that is supplied with a controlled current above a safe temperature level.

An embodiment of the invention may be applied to various physical parameter-sensing arrangements, for example, to temperature-sensing arrangements employing other temperature-sensing devices, such as other semiconductor or non-semiconductor materials. Other physical parameter-sensing arrangements can be constructed and applied using processes as introduced herein in different contexts using inventive concepts described herein, for example, a sensing arrangement to measure a different physical parameter such as a strain or a pressure.

Constraints for current consumption in an integrated circuit in automotive applications are generally much stricter when the engine is off, so that the vehicle battery is not unnecessarily discharged, particularly over an extended period of time when the vehicle is not in use. During such periods of time when the engine is off, the maximum temperature of an integrated circuit is substantially equal to the local ambient temperature, because little or no power is generally dissipated in the integrated circuit under a quiescent operating condition. Under such quiescent operating conditions, the temperature of the integrated circuit, even under the hood of an automobile, is generally 85° C. or less.

As stated above, an accurately specified over-temperature shutdown temperature is typically 200° C. As introduced herein, accurate over-temperature protection circuitry is enabled to operate only after a lower, non-critical temperature has been exceeded, for example, a temperature in the range of 85°-110° C. At lower temperatures, such as a typical room temperature, the temperature-sensing circuit is configured to draw minimal current from a power source, where a precise temperature indication is not required. The current dissipated in an integrated circuit can thus be substantially reduced.

Figure 1:
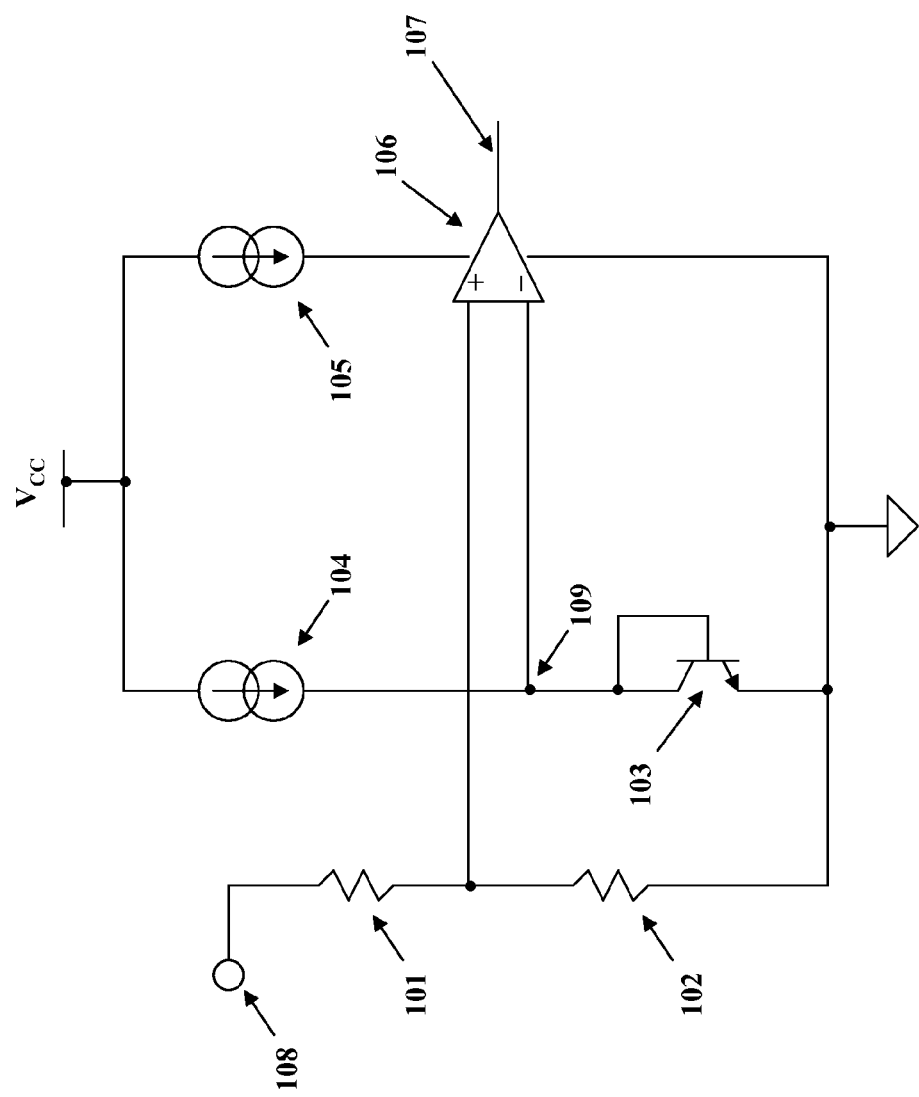
FIG. 1 illustrates a schematic drawing showing a conventional temperature-sensing circuit employing a bipolar transistor.

Turning now to FIG. 1, illustrated is a conventional temperature-sensing arrangement employing an npn transistor 103 with its base directly coupled to its collector in a diode circuit arrangement. The collector of npn transistor 103 is coupled to a current source 104 that provides a known, controlled current. The current source 104 is powered from a local bias source that supplies bias voltage $V_{CC}$. The voltage of circuit node 109 is temperature dependent, with a temperature coefficient that is approximately −2 mV/K as stated previously above. Comparator 106 has an inverting input coupled to circuit node 109, and a non-inverting input coupled to the resistor divider formed with resistors 101 and 102. The resistor divider is coupled to a regulated voltage source at circuit node 108, such as a bandgap reference. Comparator 106 is powered by current source 105 that is also coupled to the bias voltage $V_{CC}$. With substantial current supplied by current source 104, transistor 103 can provide an accurate indication of local temperature, which is signaled by a high voltage level at the output 107 of comparator 106. The current drain of the circuit illustrated in FIG. 1, which is generally higher than a desired current drain at low temperatures, is substantially independent of the temperature being sensed.

To provide an accurate indication of an over-temperature condition without the need for substantial current drain at lower ambient temperatures, where temperature-sensing accuracy is less important, two current sources are enabled at a sufficiently high temperature, for example at a temperature in the range of 85° to 110° C., where the quiescent current drain of the integrated circuit is less of an issue for an end customer, and are disabled at lower temperatures where an accurate indication of temperature is not required because the sensed temperature is already known to be relatively low and safe.

Figure 2:
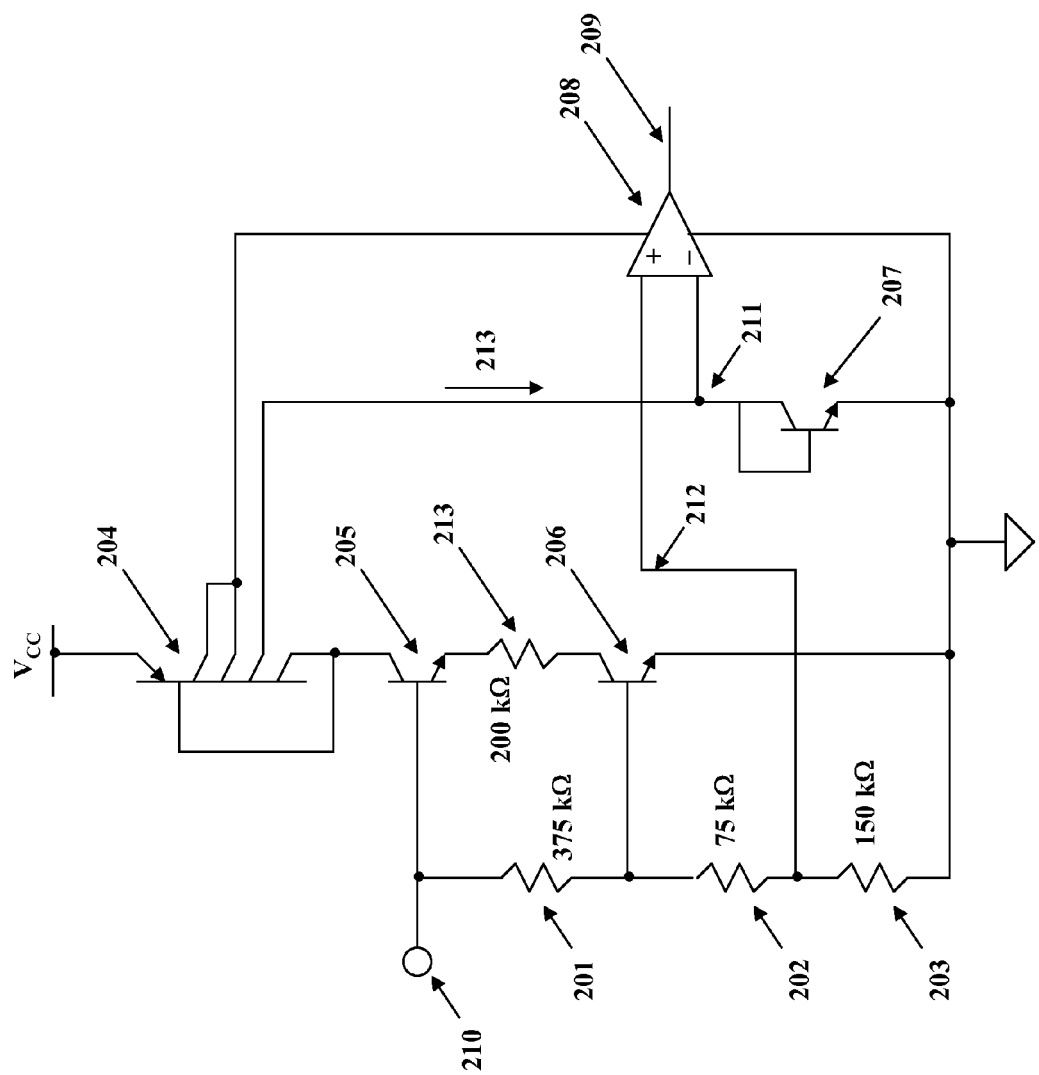
FIG. 2 illustrates a schematic drawing showing a temperature-sensing circuit employing a bipolar transistor that is enabled to conduct above a safe temperature threshold to provide an accurate temperature indication, constructed according to an embodiment.

Turning now to FIG. 2, illustrated is schematic drawing of a circuit arrangement employing a temperature-sensing transistor that is supplied with a controlled current only above a safe temperature such as a temperature between 85° and 110° C., constructed according to an embodiment. The level of the controlled current advantageously is set sufficiently high to produce an accurate temperature indication by the temperature-sensing transistor. The circuit includes pnp transistor 204 formed with a plurality of collectors. The base of transistor 204 is directly coupled to one of its collectors to produce a current-mirror circuit structure for its other collectors. The emitter of transistor 204 is coupled to the bias voltage $V_{CC}$. A controlled current flows from the collector that is directly coupled to its base. Thus, substantially the same current flows from the other collectors of this transistor (assuming equal collector areas). The current that flows from the collector of transistor 204 that is directly coupled to its base is set by npn transistor 205 arranged as an emitter follower with resistor 213. The base of transistor 205 is coupled to a voltage reference, 210, for example, to a bandgap reference voltage with a temperature-stabilized voltage that is typically in the range of 1.2 to 1.5 V. Resistor 213 is coupled in series with the collector of npn transistor 206, that acts as a temperature-sensitive switch to turn off the current flow through transistors 204 and 205 at low temperatures. The base of transistor 206 is coupled to the resistor divider formed with resistors 201, 202, and 203. Exemplary resistances of the various resistors are illustrated in the figure. The voltage of the base of transistor 206 is set to approximately 450 mV, so that transistor 206 is enabled to conduct at temperatures greater than approximately 373° K (~100° C.), and is disabled at lower temperatures. In this exemplary circuit arrangement, a controlled current of approximately 4 μA flows through transistors 205 and 206 when the temperature is greater than about 85° to 110° C.

The other three collectors of transistor 204 also conduct, for example, approximately 4 μA at high temperatures due to the current-mirror structure of this portion of the circuit. A corresponding controlled current of approximately 4 μA thus flows through npn transistor 207 which has its base directly coupled to its collector in a diode circuit arrangement. Transistor 207 is operable as an accurate temperature-sensing circuit element due to a substantial controlled current 213 flowing therethrough.

The voltage at circuit node 211 is sensed at the inverting input of comparator 208. The noninverting input of comparator 208 is coupled to a tap of the resistor divider formed with resistors 201, 202, and 203. The circuit compares the base-emitter voltage of transistor 207 with a reference voltage. The comparison can be made very precise due to the high biasing current that can now be supplied to transistor 207 without increasing the low temperature current consumption, usually specified at a temperature below 85° C. Comparator 208 is supplied with a controlled bias current of approximately 8 μA from two collectors of transistor 204. The output node 209 is kept in a high impedance state until the thermal shutdown occurs. This is done by placing a pull-down resistor (not shown) inside comparator 208 coupled to the base of an npn transistor that drives the output of the comparator. Accordingly, output signal 209 from comparator 208 accordingly indicates if the temperature sensed by transistor 207 is greater than a threshold level.

When the ambient temperature is less than approximately 85°-110° C., current flow through transistor 204 is disabled by transistor 206, thereby shutting off current flow to transistor 207 and to comparator 208. As a result, the current drain in the temperature sensing circuit is substantially zero at lower ambient temperatures. The resistor divider is generally present in another portion of the integrated circuit, and the drain therein is substantially unaffected by an embodiment of the temperature sensing portion of the circuit.

The concept has thus been introduced of constructing a device to sense a physical parameter with a first sensing circuit configured to assert a signal when a sensed level of the physical parameter crosses a first threshold level, and a second sensing circuit configured to substantially disable a bias current to the first sensing circuit when a sensed level of the physical parameter crosses a second threshold level. In an embodiment, the first threshold level is higher than the second threshold level. In an embodiment, the first sensing circuit is configured to assert the signal when the sensed level of the physical parameter by the first sensing circuit exceeds the first threshold level, and the second sensing circuit is configured to substantially disable the bias current to the first sensing circuit when the sensed level of the physical parameter by the second sensing circuit is less than the second threshold level. In an embodiment, the device draws a reduced current from a power source when the sensed level of the physical parameter by the second sensing circuit is less than the second threshold level. In an embodiment, the physical parameter is temperature. In an embodiment, the first sensing circuit is formed with a first bipolar transistor with a base coupled to a collector thereof, the collector of the first bipolar transistor coupled to a controlled current source. In a further embodiment, the second sensing circuit is formed with a second bipolar transistor with a base coupled to a reference voltage source to substantially disable the bias current when the level of the physical parameter is below the second threshold level. In a further embodiment, the second sensing circuit is formed with a current mirror coupled to the second bipolar transistor to substantially disable the bias current. In a further embodiment, the bias current is a controlled bias current Another exemplary embodiment provides a method of sensing a physical parameter. In an embodiment, the method includes configuring a first sensing circuit to assert a signal when a level of the physical parameter sensed by the first sensing circuit crosses a first threshold level, wherein the first sensing circuit is enabled to operate from a bias current. The method further includes coupling a second sensing circuit to the first sensing circuit to provide the bias current, and configuring the second circuit to substantially disable the bias current when the level of the physical parameter sensed by the second sensing circuit crosses a second threshold level. In an embodiment, the method includes setting the first threshold level higher than the second threshold level. In an embodiment, the method includes configuring the first sensing circuit to assert the signal when the sensed level of the physical parameter by the first sensing circuit exceeds the first threshold level, and configuring the second sensing circuit to substantially disable the bias current to the first sensing circuit when the sensed level of the physical parameter by the second sensing circuit is less than the second threshold level. In an embodiment, a current drawn from a power source by the first and the second sensing circuits when the physical parameter is less than the second threshold level is substantially less than the current drawn from the power source when the physical parameter is greater than the second threshold level. In an embodiment, the physical parameter is temperature. In an embodiment, the method further includes forming the first sensing circuit with a first bipolar transistor with a base coupled to a collector thereof, and coupling the collector of the first bipolar transistor to the bias current. In an embodiment, the method further includes forming the second sensing circuit with a second bipolar transistor with a base coupled to a reference voltage source to substantially disable the bias current when the level of the physical parameter is below the second threshold level. In an embodiment, the second sensing circuit comprises a current mirror coupled to the second bipolar transistor to substantially disable the bias current. In a further embodiment, the bias current is a controlled bias current.

Although processes for sensing a temperature and related methods have been described for application to automotive environments, it should be understood that other applications of these processes such as for sensing a different physical parameter are contemplated within the broad scope of the invention, and need not be limited to temperature-sensing applications in an automotive environment employing processes introduced herein.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A device for sensing a physical parameter, comprising:
   a first sensing circuit comprising a first circuit element responsive to the physical parameter, the first sensing circuit generating a first signal that varies according to the physical parameter;
   a comparison circuit comparing the first signal to a first reference signal corresponding to a first threshold level of the physical parameter, the comparison circuit configured to assert a signal when a sensed level of the physical parameter crosses the first threshold level; and
   a second sensing circuit for the physical parameter configured to substantially disable a bias current to the first circuit element of the first sensing circuit when a sensed level of the physical parameter crosses a second threshold level.

2. The device as claimed in claim 1, wherein the first threshold level is higher than the second threshold level.

3. The device as claimed in claim 1, wherein the first sensing circuit is configured to assert the signal when the sensed level of the physical parameter exceeds the first threshold level, and wherein the second sensing circuit is configured to substantially disable the bias current to the first sensing circuit when the sensed level of the physical parameter is less than the second threshold level.

4. The device as claimed in claim 3, wherein the device draws a reduced current from a power source when the sensed level of the physical parameter by the second sensing circuit is less than the second threshold level.

5. The device as claimed in claim 1, wherein the physical parameter is temperature.

6. The device as claimed in claim 5, wherein the first circuit element of the first sensing circuit comprises a first bipolar transistor with a base coupled to a collector thereof, the collector of the first bipolar transistor coupled to a controlled current source.

7. The device as claimed in claim 6, wherein the second sensing circuit comprises a second bipolar transistor with a base coupled to a reference voltage source to substantially disable the bias current when the sensed level of the physical parameter is below the second threshold level.

8. The device as claimed in claim 7, wherein the second sensing circuit comprises a current mirror coupled to the second bipolar transistor to substantially disable the bias current.

9. The device as claimed in claim 1, wherein the bias current is a controlled bias current.

10. A method of sensing a temperature, the method comprising:
generating a first temperature dependent signal biased by a first bias current;
comparing the first temperature dependent signal to a reference signal, the reference signal corresponding to a first temperature threshold;
activating an output signal if the first temperature dependent signal crosses the reference signal, wherein the output signal is activated when the temperature is greater than the first temperature threshold;
generating the first bias current if the temperature is greater than a second temperature threshold, wherein the second temperature threshold is less than the first temperature threshold; and
substantially disabling the first bias current if the temperature is less than the second temperature threshold.

11. The method of claim 10, wherein the second temperature threshold is between about 85° C. and about 110° C.

12. The method of claim 10, wherein the first temperature threshold is higher than about 200° C.

13. The method of claim 10, wherein generating the bias current comprises activating a temperature dependent switch coupled to reference input of a current mirror when the temperature increases beyond the second threshold.

14. A temperature sensor comprising:
a bias generator configured generate a first bias current, the bias generator configured to substantially disable the first bias current when a measured temperature is less than a first threshold temperature;
a temperature dependent circuit element powered by the first bias current; and
a comparator having a first input coupled to temperature dependent circuit element, and a second input coupled to a reference signal, the reference signal corresponding to a first second threshold temperature, the second threshold temperature greater than the first threshold temperature.

15. The temperature sensor of claim 14, wherein the first temperature threshold is between about 85° C. and about 110° C.; and
the second temperature threshold is higher than about 200° C.

16. The temperature sensor of claim 14, wherein:
the temperature dependent circuit element comprises a diode connected bipolar transistor; and
the bias generator comprises
a current mirror having a first output coupled to the diode connected bipolar transistor, and
a temperature dependent switch in series with a reference input of the current mirror.

17. The temperature sensor of claim 16, wherein the temperature dependent switch comprises:
a first bipolar transistor having a base coupled to a first reference voltage and an emitter coupled to ground;
a resistor having a first end coupled to a collector of the first bipolar transistor; and
a second bipolar transistor having a base coupled to a second reference voltage, an emitter coupled to a second end of the resistor, and a collector coupled to the reference input of the current mirror.

18. The temperature sensor of claim 17, wherein the second reference voltage comprises a bandgap voltage.

19. The temperature sensor of claim 18, wherein the first reference voltage is generated by a resistor divider coupled to the bandgap voltage.

20. The temperature sensor of claim 14, wherein:
the bias generator is further configured to generate a second bias current, the bias generator configured to substantially disable the second bias current when the measured temperature is less than the first threshold temperature; and
the comparator receives its power from the second bias current.

* * * * *